Sept. 19, 1933.  C. HAGEN  1,927,312
CONTINUOUS CONVERSION OF STARCH
Filed July 24, 1930   2 Sheets-Sheet 1
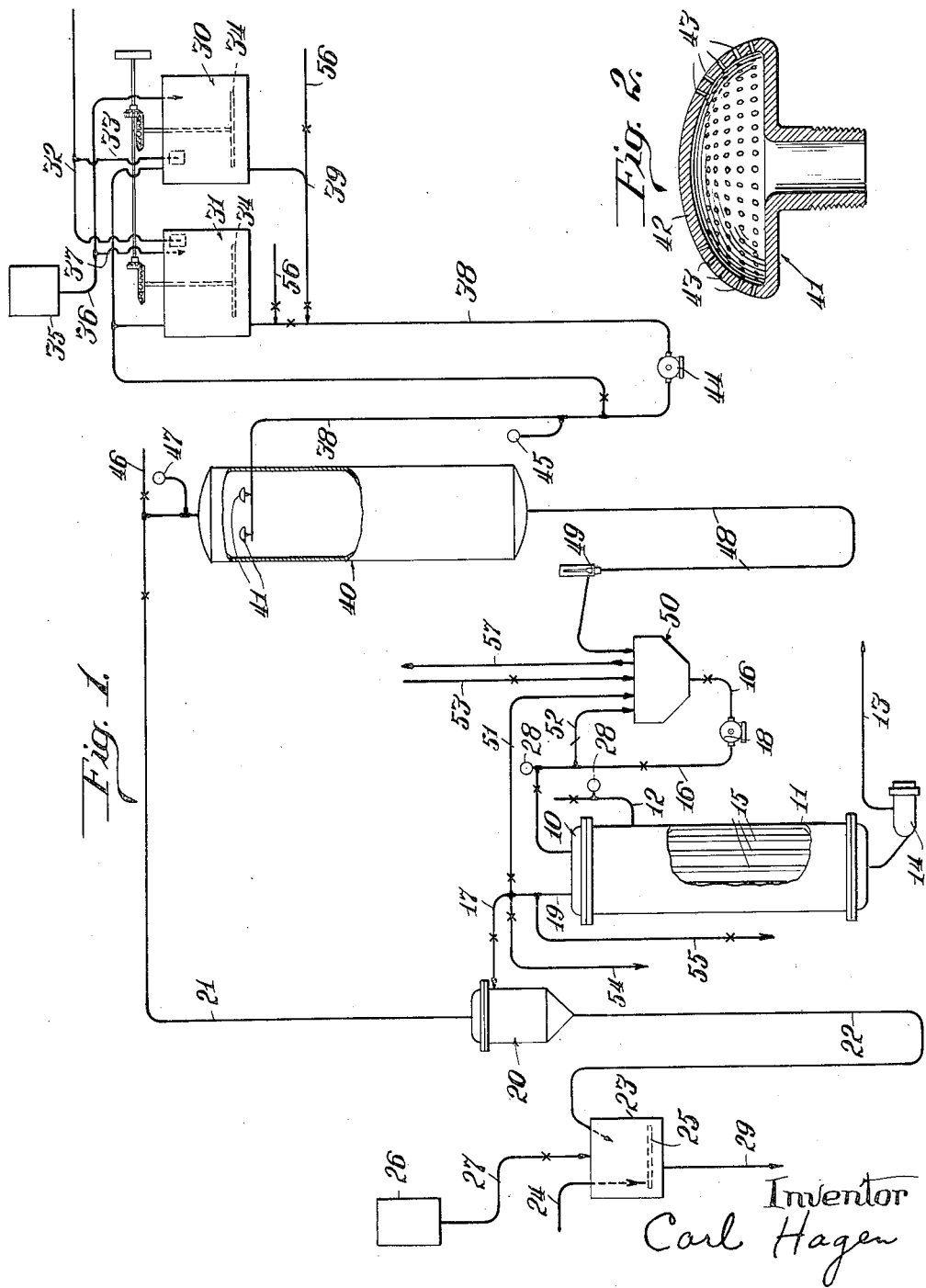

Patented Sept. 19, 1933

1,927,312

UNITED STATES PATENT OFFICE 1,927,312

CONTINUOUS CONVERSION OF STARCH

Carl Hagen, Park Ridge, Ill., assignor to International Patents Development Company, Wilmington, Del., a corporation of Delaware Application July 24, 1930. Serial No. 470,303

4 Claims. (Cl. 127—38)

My invention relates to the pasting of starch in connection with the conversion of the starch, by a continuous or by a batch process, in the manufacture of starch syrup (commonly called glucose) or in the manufacture of solid starch sugars, such as cerelose, argo sugar and the so-called 70 and 80 sugars or other like products. The invention has for one of its objects to improve upon the method of continuous conversion disclosed and claimed in my copending application Serial No. 274,840, filed May 3, 1928, in respect particularly, to the pasting or gelatinizing treatment of the starch which takes place before the magma is sent to the converter. A further object of the invention is to improve upon the present system of converting starch in batches.

In accordance with the method of continuous conversion of the application above referred to the starch magma is acidulated and also gelatinized or pasted in batches in tanks containing perforated steam rings through which steam is injected into the liquid. The pasted starch is then passed under considerable pressure through converting tubes of relatively small diameter, or through groups of parallel tubes connected by headers, which tubes are enclosed in vessels kept filled with steam or other suitable heating fluid. The improvement of the present invention contemplates the same type of conversion, but the starch is pre-treated continuously instead of batches and preferably by spraying the starch magma into an atmosphere of steam of controlled temperature. This treatment pastes the starch and to a considerable extent dextrinizes it. The treatment is preferably carried to a point which gives a small percentage of dextrose in the outgoing magma, which consists of a smooth liquid substance of high fluidity.

The advantage of pretreatment of this character, in addition to the advantages resulting generally from the use of a continuous instead of a batch process, is that the pasting or partial conversion of the starch is uniform and gives a thin, smooth liquid substance which will pass through the pumps and converter tubes evenly and unobstructedly, with the result that the conversion is perfectly uniform and accurately controllable. The continuous character of the pasting operation, as well as the spray method of heating the starch magma, tends to produce this desirable result, since the pasted material passes directly to the converter as soon as it is treated instead of being subject to the irregularities incident to the filling of the pasting vessels and the drawing off of the liquid therefrom, over a considerable period of time, to the converter. With batch pasting of any sort it is difficult to obtain a uniformly treated magma for conversion. One of the principal advantages of continuous conversion is that it results in a uniform product converted to the extent required, and to obtain this result as completely as is desirable, it is necessary that the starch be uniformly pasted in the pre-conversion step and given a certain fluidity which, it has been discovered, is best obtained by the continuous spraying method to be hereinafter described.

The pasting method to be hereinafter described may also be applied advantageously to the ordinary batch process of conversion and results in simplifying the process, saving time, saving steam and improving the product by giving greater uniformity.

Other incidental objects of the invention will appear in the following specification.

Apparatus suitable for carrying out the improved methods is shown, diagrammatically, in the appended drawings, in which Fig. 1 is a view partly in elevation and partly in section illustrative of the apparatus for continuous conversion designed in accordance with my invention;

Fig. 2 is a vertical sectional view of one of the spray nozzles; and

Figure 3:
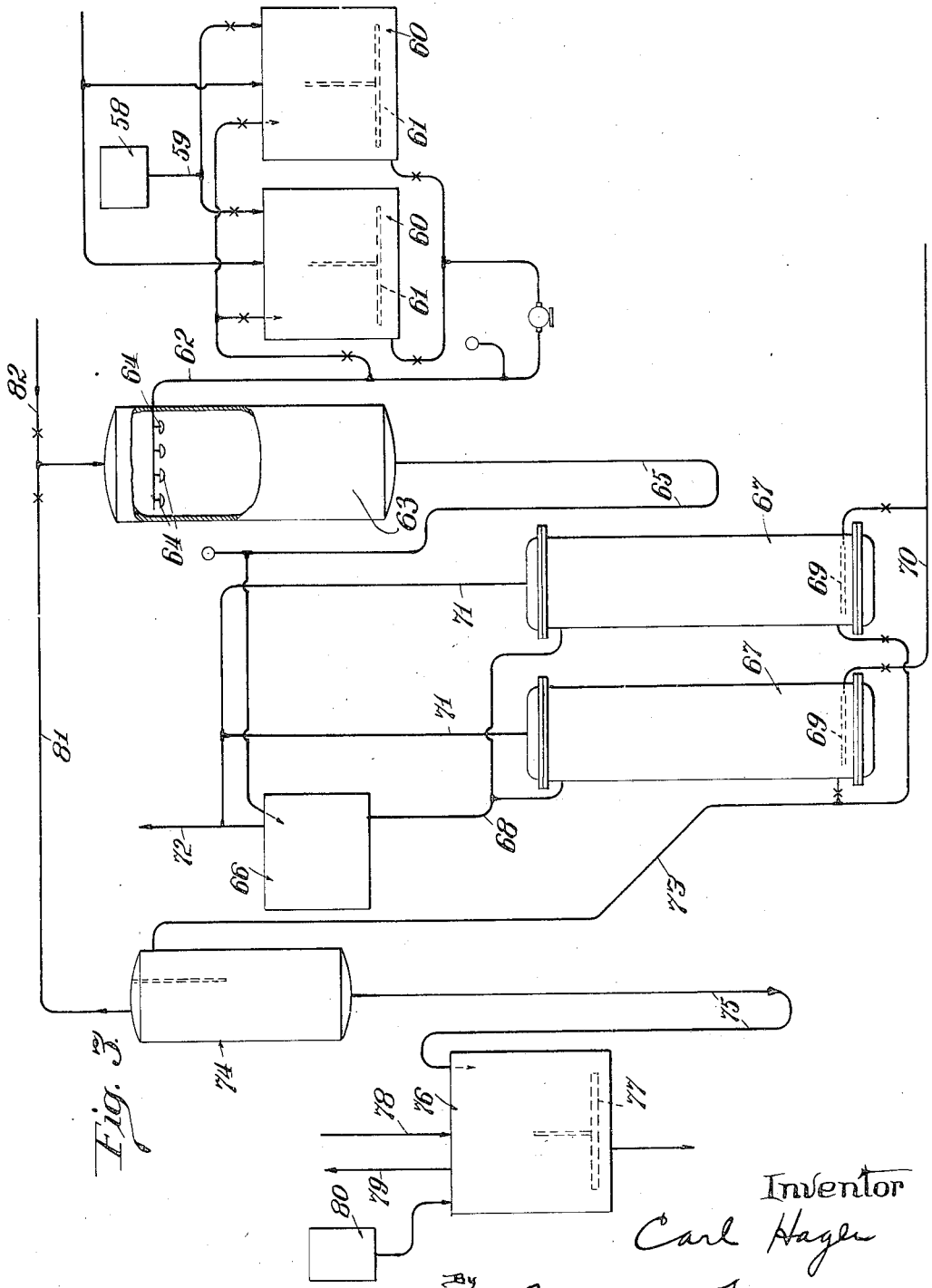
Fig. 3 is a diagrammatic view of an apparatus embodying the invention for batch conversion.

Referring first to Figs. 1 and 2 of the drawings, 10 designates a continuous converter comprising a casing 11, which is supplied with steam through pipe 12 and from which condensate is discharged through pipe 13 provided with a steam trap 14. Extending through casing 11 are a number of converter pipes 15 through which the starch magma (after pretreatment to be hereinafter described) is passed under pressure. The starch magma enters the converter through pipe 16 and issues therefrom through a pipe 17. 18 is a pump in pipe 16 and 19 a needle valve in pipe 17, which latter, assuming the action of the pump and the temperature of the liquid to be constant, is set to control the pressure of the starch magma in the converter tubes and the length of time to which the magma in the tubes is subjected to the heat of the steam surrounding such tubes. Control of the conversion depends upon the steam temperature within the shell 11, variable by variation of the steam supply, and the adjustment of needle valve 19 which serves to throttle the outflow of the converted liquor through pipe 17. The converter is shown conventionally. The essentials are that the liquid undergoing treatment should pass through conduits of considerable length in proportion to their cross-sectional area which are surrounded by a suitable heating fluid, such as steam.

From the pipe 17 the converted liquor enters an expansion chamber 20, from the top of which leads an exhaust steam pipe 21, extending to the pasting vessel, to be described, and from the bottom of which leads a looped pipe 22, through which the converted liquor is discharged into the neutralizing vessel 23. Compressed air may be introduced into the liquid through pipe 24 and perforated ring 25. The neutralizing solution enters the vessel from supply tank 26 through pipe 27. All of the conduits referred to herein may be provided with valves, as indicated. Pipes 12 and 16 are preferably provided with steam pressure gauges 28, 28. The pump 18 is designed to exert a pressure somewhat higher, for example, 10 pounds higher, than the steam pressure in the converter. As the outflow pipe 17 is throttled, and because of the friction of the magma flowing through the converter tubes, the magma in the tubes is under a pressure correspondent to its temperature, approximating that of the steam in vessel 11, plus the pressure exerted by the pump 18. These factors, together with the adjustment of the needle valve 19, determine the time to which the starch magma is subjected to the high temperature of the converter. For starch syrup (glucose) 45 pounds steam pressure is maintained with the needle valve adjusted so that the material may be said to remain in the converter for about four minutes. For solid sugar conversion a steam pressure of about 90 pounds is desirable for a corresponding adjustment of the needle valve. These figures are based upon a magma of 23° Baumé for glucose and 12½° Baumé for solid sugar conversions. To some extent the time and temperature factors are reciprocally variable, and generally speaking, the temperature and time figures are to be taken as illustrative and subject to variation, due to possible variations in the particular construction of the apparatus and in the fluidity of the magma, and to other like considerations, which will be understood by those skilled in this art.

A steam pressure of about 4 pounds is ordinarily maintained in the expansion chamber, by means of the looped pipe 22, if the exhaust steam is to be used for pasting as is desirable for reasons of economy. This is not an essential feature of the invention. Any pressure sufficient to deliver the steam to the pasting apparatus may be maintained in the expansion chamber. The liquor from the expansion chamber passes through the pipe 22 to the neutralizer tank 23, where, after a tank is half filled, a soda solution is slowly added during the second half of the filling period. During this latter stage of the neutralization, compressed air is admitted to the tank through pipe 24 and violent agitation is produced until the desired degree of acidity is reached. The neutralized liquid outflows through pipe 29.

The present invention, however, is concerned primarily with the pre-treatment of the starch, which will now be described.

The starch and water magma enters one of two mixing tanks 30, 31, through a pipe 32 having a branch 33 leading to tank 30. The tanks are provided with rotating agitators 34, 34. The hydrolyzing acid is introduced from a supply vessel 35, into the tanks 30, 31, through a pipe 36 having a branch 37 leading to tank 31. In this way the acid is mixed into and distributed in the starch magma, the operation being a batch operation, and the tanks 30, 31 being used alternately.

The acidified starch magma passes through pipe 38, having a branch 39 connected with tank 30, into the pasting vessel 40 through spray nozzles 41. The spray nozzles are preferably formed with enlarged spherically surfaced heads 42 (Fig. 2) provided with very small perforations 43. A pump 44 in the pipe 38 exerts a high pressure on the liquid in the spray nozzles. This pressure may be as high as 75 pounds and can be regulated by reference to the pressure gauge 45. The exhaust steam from the expansion chamber passes through pipe 21 to the top of the pasting vessel 40. If the supply of steam from this source is insufficient, which depends on the steam pressure used for converting, additional live steam is introduced through the steam connection 46. The steam pressure in the pasting chamber should not ordinarily be above 5 pounds (approximately 228° F.). The preferred pressure is between 2 and 3 pounds, with a temperature of from 217° to 225° F., which will give the sprayed starch magma a temperature of about 200° to 205° F. This temperature should be at least 190° F., and preferably somewhat higher, to give the resultant magma the desired fluidity. Pasting at low temperatures produces a thickening of the magma. At higher temperatures, in the neighborhood of 190° F., the liquid becomes thin again. High fluidity is desirable in order that the liquid may be readily handled without obstruction by the pumps and as the liquid passes through pipes and valves. The desired steam pressure may be maintained in the pasting vessel by observation of the pressure gauge 47. The pasted starch magma flows out of the pasting vessel 40 through pipe 48, in which is arranged, preferably, a thermometer 49, for closer determination of the pasting temperature. Pipe 48 leads to a converter supply vessel 50, from which leads pipe 16 to the converter, as above described.

Preferably a by-pass pipe 51 leads from the discharge pipe 17 of the converter back to the supply vessel 50, so that if in starting up the apparatus the converted liquor is not up to purity, it can be returned to the converter for further treatment. Pipe 52 is a by-pass from pipe 16 back to the vessel 50, which permits pump 18 to be operated, without losing its prime, if it is necessary to diminish or cut off the supply to the converter.

Preferably a water pipe 53 leads to the vessel 50. The discharge pipe 17 for the converted liquor has a connection 54 to the sewer. These arrangements permit the washing out of the apparatus. 55 is a test pipe for drawing off converted liquor for tests. Water pipes 56, 56 are connected with discharge pipes from the mixing tanks 30, 31 so that the latter may be washed out periodically. 57 is a vent pipe from the vessel 50 for discharging re-evaporated steam.

Fig. 3 illustrates the application of the invention to the current method of batch conversion of starch for corn syrup or sugar.

In accordance with this method as heretofore practiced, tempering water containing the hydrolyzing acid is first run into the converter so as to cover the perforated steam ring in the bottom of the converter, and the steam turned on. The starch and water magma is then run into the converter from the top at a slow rate, the vent in the top of the converter being left open. In this way, the starch is pasted, through heat treatment at relatively low temperatures. When the converter is fully charged the vent is closed and the pressure built up to whatever pressure may be desired, 45 pounds for example for a sugar conversion, by the continued introduction of steam into the vessel through the steam ring. This pressure is maintained until the conversion is completed, whereupon the valve in the discharge pipe is opened and the contents of the converter blown up into the neutralizing tank. The process consumes a good deal of time, the waste of steam on a large scale operation is very considerable and the batch is not always uniformly converted, unless considerable care and supervision is exercised.

The improved process of batch conversion contemplated by my invention, effects a considerable saving in time, saves practically all of the heat units lost by the old method and gives a more uniform product.

Referring to Fig. 3, 58 designates an acid supply tank connected by a valved pipe 59 with the starch acidulating tanks 60, which latter are provided, preferably, with agitators 61. A pipe 62 leads from the acidulating tank to the pasting vessel 63, within the vessel, provided with spray nozzles 64. A return bent discharge pipe 65 leads from the bottom of the pasting chamber to the converter supply tank 66, from which the pasted starch enters the converter 67 through pipe 68. The converter is provided with the usual perforated steam ring 69 and steam supply pipe 70. A valved vent pipe 71 leads from the top of the converter. The converter supply tank has a vent pipe 72, which normally discharges to the atmosphere the re-evaporated vapor from the pasted starch. The discharge pipe 73 leads from the bottom of the converter to an expansion tank 74. The discharge pipe 75 from the expansion tank has a return bent portion and enters the top of the neutralizing vessel 76 which is provided with a perforated pipe 77 in the bottom supplied with compressed air through pipe 78. The neutralizer has a vent pipe 79 and is supplied with neutralizing agent from a tank 80. Steam re-evaporated in the expansion chamber passes through pipe 81 to the pasting vessel, into which live steam may also be introduced through pipe 82.

The method of operation will be obvious from the above description of the apparatus. The acidulation and pasting of the starch takes place under the same conditions as have been described in connection with the continuous conversion of the pasted starch. It will be understood that in ordinary installations of any considerable size, there will be a number of converters supplied with starch from vessel 66, all of this starch having been pasted in the single pasting vessel 63. The improved method makes it unnecessary to use tempering water. The converter may be charged as rapidly as the liquid will run into the converter from the supply tank 66. The steam can be turned into the converter as the vessel is being charged without danger of lumping since the pasted starch is at a relatively high temperature and in the form of thin magma of gelatinized, and to a considerable extent, dextrinized starch. A number of converters will ordinarily discharge into a single expansion chamber so that it is possible to maintain a more or less constant steam pressure in this chamber for supplying steam to the pasting vessel.

By this method of pasting it is possible to dextrinize the starch to the extent of 55% or more (by weight dry substance basis) with a dextrose content up to 7% or more. There is a considerable advantage in thus initiating the conversion in the preliminary or pasting stage provided the operation is uniform. This is particularly true in batch conversion employing expensive apparatus, since the shortening of the period of treatment in the converter makes possible the reduction in the size of the converter equipment. The process of this invention is radically different from the processes involving the desiccation of the sprayed material by subjecting it to the action of super-heated steam or other drying gas. In these desiccating processes the product is not only a dry product of pulverulent character, instead of a liquid as required for the further steps of the process of the present invention, but the extraction of water under application of heat gives a different modification to the starch from that which takes place when the starch material remains throughout in a liquid state. In the process of this invention the steam, which is saturated steam, is condensed by contact with the sprayed starch liquor so that the starch liquor leaving the pasting chamber is more dilute than the starch liquor entering it.

It is my intention to cover all known equivalents of the apparatus and methods described as well as modifications thereof within the scope of the appended claims.

I claim:

1. In the manufacture of starch syrups or sugars by the acid hydrolysis conversion of corn starch, the improvement which consists in bringing a mixture of water and starch in the form of a spray into contact with steam to heat and paste such mixture without evaporating the water therefrom and collecting the pasted starch in a liquid state and subjecting it to the hydrolyzing conversion.

2. The process of claim 1 in which acid is introduced into the starch and water mixture before the same is subjected to the pasting operation.

3. The process of claim 1 in which the steam for the pasting operation is supplied at a temperature between 217° F. and 228° F.

4. The process of claim 1 in which the steam for the pasting operation is supplied at a temperature to heat the starch liquor to a temperature between 190° F. and 205° F.

CARL HAGEN.